Patented June 29, 1943

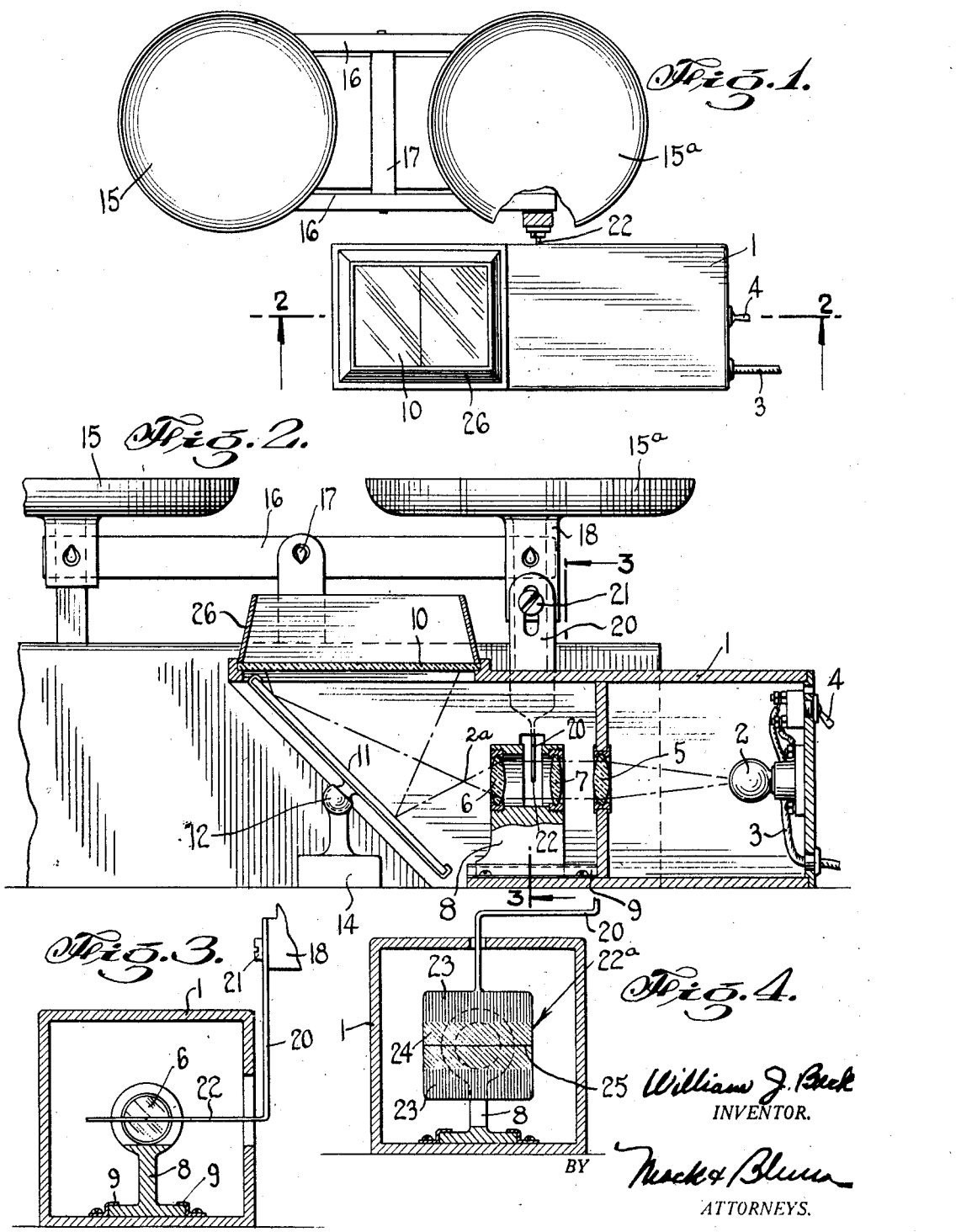

2,322,813

UNITED STATES PATENT OFFICE 2,322,813

SCALE

William J. Beck, Yonkers, N. Y.

Substitute for abandoned application Serial No. 558,433, August 21, 1931. This application August 3, 1940, Serial No. 350,753

8 Claims. (Cl. 88—24)

My invention relates to a new and improved scale.

One of the objects of my invention is to provide an improved indicating device for a scale.

Another object of my invention is to provide a new and improved visual indicating device which may be applied to, or combined with a scale or weighing device of any type.

Another object of my invention is to provide a visual indicating mechanism which may be applied to or combined with a scale or weighing device of any type in order to conveniently and accurately indicate the setting of the scale.

Another object of my invention is to apply to or combine with a scale or weighing device of any suitable type, an optical system, so that the light which is produced by said optical system is influenced by the setting or movement of the scale or the like.

Other objects of my invention will be set forth in the following description and drawing, it being understood that the above general statement of the objects of my invention is intended to generally explain the same and not to limit it in any manner.

Fig. 1 is a plan view;

Fig. 2 is a sectional view on the line 2—2 of Fig. 1;

Fig. 3 is a sectional view on the line 3—3 of Fig. 2;

Fig. 4 shows a modification.

I have shown my improved indicating system used in conjunction with a balance of conventional type, having pans 15 and 15a, which are mounted upon the arms 16, which is pivotally mounted on the member 17. This part of the embodiment is conventional and merely illustrates one of the types of weighing mechanism to which my invention may be applied, it being understood that the invention may be applied to, or used in conjunction with, any weighing device of any type.

The indicating mechanism is located in a casing 1.

An electric bulb 2 is located within the casing 1 and this bulb 2 is provided with the usual lead wires 3, and the circuit of the bulb is controlled by a switch 4. A lens 5 is mounted in a partition located within the casing 1. This lens 5 produces a parallel beam of light, so the filament of the bulb 2 is located at the focus of the lens 5 in the ordinary manner.

The parallel rays of light now pass a condenser comprising lenses 7 and 6, so that the rays of light are directed upon the mirror 11, which is adjustably mounted in the ball-socket 12, provided at the upper end of the support 14. Hence, the mirror 11 can be adjusted in any plane, so that the light which falls thereon is reflected to a sheet of frosted glass 10, which has an enclosure 26.

The lens system which comprises the lenses 6 and 7, is mounted upon a slidable support 8, which can slide between guides 9. This permits the adjustment of the position of the lenses 6 and 7, with respect to the lens 5.

The pan 15a is provided with a lug 18 to which an arm 20 is adjustably secured by means of a clamping screw 21. The lower end of the arm 20 is narrow, and it terminates in an extension 22 which intersects the beam of light passing between the lenses 7 and 6. The light-intercepting member 22 is preferably narrow, so that it produces a dark zone upon the member 10, and this dark zone has the shape of a straight line.

For convenience, the member 10 may be designated as a screen, because the light is projected upon this screen 10, by means of the lenses and reflecting member 11, and a shadow is also produced upon this screen by means of the member 22, and this shadow has the same effect as the spider line in a telescope, or the like. The member 22 and the equivalent member 22a may be designated as a "pointer member," since the effect is to cause a dark line or a luminous line to move across the stationary screen 10.

When the pans 15 and 15a contain equal weights, the arm 16 either oscillates in equal arcs about a zero point or it does not oscillate, so that the projected shadow of the member 22 either shifts equally about a zero point, or it remains coincident with the zero point. The screen 10 may be provided with a suitable scale or calibration in order to determine if this shadow moves equally and in opposite directions with respect to the zero point of said scale which may be located in the middle portion of the screen 10. If the shadow oscillates equally and in opposite directions with respect to the zero point, this shows that there are equal weights in the pans 15 and 15a. Since the projected shadow of the member 22 can be made very thin, a very sensitive and accurate indicating mechanism is provided, which is practically free from friction as the movement of the shadow is directly produced by the movement of the movable member of the scale. In addition, the indicating shadow of the member 22 is shifted along a horizontal screen. However, the screen can be in any plane and located at any point, and it can be made of any desired size.

In the embodiment shown in Fig. 4, the arm 20 is connected to an enlarged member 22a. This member 22a has a central spider line 25 which is located in a colored zone 24. The top and bottom of the member 22a are provided with colored zones 23. The zones 23 and 24 preferably have contrasting colors. For example, the middle zone 24 can have a green color and the top and bottom zone 23 may have blue or red colors. The hairline 25 has the usual black color, and this hairline 25 occupies about the same position as the member 22 which is illustrated in the first embodiment. If desired, the member 22a could be opaque or translucent, and the line 25 could represent a slit, so that a narrow line of light would be projected upon the screen.

The effect of the optical system is to project an image of the member 22a upon the screen 10, and the projection of the hair-line 25 fulfills the same function as the projected shadow of the member 22.

While I have shown an optical ssytem which projects light upon a screen, I also wish to include within the scope of my invention an optical system by means of which the light would be reflected upon the screen.

It will be noted that the action of the entire lens system is to produce a real image of the filament of the bulb 2, at the point 2a, so that the light from the real image 2a is upwardly reflected by the mirror 11, upon the screen 10.

The main object of my invention is to eliminate friction, so that the scale remains accurate and requires little or no servicing. In an ordinary scale, the indicating device consists of movable mechanical parts, which have friction and which require adjustment. According to my invention the movable member of the scale has directly connected thereto a member which controls a beam of light. While the light-controlling member which has been specifically illustrated operates to intercept part of a beam of light consisting of parallel rays, I do not wish to limit the scope of my invention to the use of parallel rays. Indeed, a light-controlling member can operate to cause the movement of a beam of light in order to indicate the movement or lack of movement of the movable member of the scale. For example, a mirror could be connected to the movable member of the scale, and this mirror could reflect a beam of light, so that the movement of the mirror, or the change of inclination thereof could change the angle of the reflected beam of light. Likewise, while I prefer to directly connect the light-controlling member to the movable member of the scale, I do not wish to exclude any intermediate and substantially frictionless connecting means.

The effect of interposing the member 22 in advance of the condensing lens 6 is to cause said member 22 to intercept some of the light before it is finally condensed to form a luminous area at the point 2a.

However, the preferred embodiment illustrated has decided advantages, because the moving shadow has a limited range of movement, and the apparatus is not required to change the inclination of a mirror or like, which would produce a relatively large movement of a reflected beam of light. Likewise, the elimination of a movable mirror is desirable, because mirrors often become covered with dust or a film of moisture.

The improved optical system produces a movement of the shadow (or thin line of light), which magnifies the movement of the scale without the use of drums, cams, tapes, or bearings. The absence of such mechanical devices makes it possible to project the shadow or light to any screen at any distance, and said screen can be located at any desired angle to the scale.

I have shown a preferred embodiment of my invention, but it is clear that numerous changes and omissions can be made without departing from its spirit.

The present application is a refile of application Ser. No. 558,433, filed August 21, 1931, which became abandoned on February 20, 1936.

I claim:

1. An indicator device for a weighing mechanism having a movable part moving to different positions before the correct weight is achieved, when the correct weight is achieved, and if the correct weight is exceeded, said device including a casing including a horizontal stationary screen in the top at one side thereof having indicia thereon, a source of light at one side thereof away from the screen, a lens system, the axis of which extends horizontally and longitudinally through the casing between the light source and the screen, including sucessive lenses to produce a parallel beam of light from the light source and to condense the beam, an obliquely positioned mirror below the screen to receive the condensed beam and project it upon the screen and means to intercept a portion of the light beam before it is condensed and when the beams are parallel.

2. The device of claim 1, said means including a dependent element from said movable part having an extension projecting into the path of said beam between said successive lenses.

3. The device of claim 1, said last mentioned means including a movable element positioned between said successive lenses, and a connection from said movable part to said element to cause said element to assume different positions in accordance with the different positions of said movable part.

4. The device of claim 1, adjustment means being provided to adjust the position of said mirror and the relative position of said successive lenses.

5. The device of claim 1, said mirror forming one end wall of said casing adjacent said screen and a mount for said mirror being provided with a ball and socket joint to permit change in the obliquity of said mirror.

6. The device of claim 1, said screen being provided with a converging shield.

7. An indicator device for a weighing mechanism having a movable part moving to different positions before the correct weight is achieved, when the correct weight is achieved, and if the correct weight is exceeded, said device including a casing including a screen at one side thereof having indicia thereon, a source of light at one side thereof away from the screen, a lens system, the axis of which extends through the casing at a substantial angle to the screen between the light source and the screen, including successive lenses to produce a parallel beam of light from the light source and to condense the beam, a mirror positioned obliquely to the axis of the lens system before the screen to receive the condensed beam and project it upon the screen and means to intercept a portion of the light beam before it is condensed and when the beams are parallel.

8. The indicated device of claim 7, said intercepting means being colored and having a relatively wide central space of one color as a maximum tolerance and bands of other colors outside of said central space to show another color indicating that the weight is beyond the range of allowable tolerance.

WILLIAM J. BECK.